US012023883B2

United States Patent
Peter et al.

(10) Patent No.: US 12,023,883 B2
(45) Date of Patent: Jul. 2, 2024

(54) DEVICE FOR MIXING AND/OR DOSING LIQUID COATING MATERIALS, COATING SYSTEM HAVING SUCH A DEVICE, AND METHOD FOR COLORING OPTICAL GLASSES

(71) Applicant: Satisloh AG, Baar (CH)

(72) Inventors: Marc Peter, Zürich (CH); Christian Roth, Zürich (CH); Reto Strobel, Zürich (CH); Stephan Scholze, Birmensdorf (CH)

(73) Assignee: Satisloh AG, Baar (CH)

( * ) Notice: Subject to any disclaimer, the term of this patent is extended or adjusted under 35 U.S.C. 154(b) by 806 days.

(21) Appl. No.: 16/957,795

(22) PCT Filed: Dec. 28, 2018

(86) PCT No.: PCT/EP2018/000586
§ 371 (c)(1),
(2) Date: Jun. 25, 2020

(87) PCT Pub. No.: WO2019/129377
PCT Pub. Date: Jul. 4, 2019

(65) Prior Publication Data
US 2020/0398510 A1    Dec. 24, 2020

(30) Foreign Application Priority Data
Dec. 28, 2017 (EP) ..................... 17002086

(51) Int. Cl.
*B01F 35/71* (2022.01)
*B01F 25/451* (2022.01)
(Continued)

(52) U.S. Cl.
CPC .... *B29D 11/00923* (2013.01); *B01F 25/4512* (2022.01); *B01F 31/651* (2022.01);
(Continued)

(58) Field of Classification Search
CPC ............. B01F 33/84; B01F 35/2136; B01F 35/717613; B01F 2101/30; B01F 25/4512;
(Continued)

(56) References Cited

U.S. PATENT DOCUMENTS 3,972,350 A * 8/1976 Pickett .................. F16K 11/074
137/625.11
4,989,641 A * 2/1991 Jones ................ F16K 31/52466
251/188
(Continued)

FOREIGN PATENT DOCUMENTS

JP    H0999494 A    4/1997
KR    100807001 B1    2/2008

OTHER PUBLICATIONS

Extended European Search Report for Application No. 17002086.1 dated Jul. 2, 2018 (9 pages).
(Continued)

*Primary Examiner* — Charles P. Cheyney
(74) *Attorney, Agent, or Firm* — Reising Ethington P.C.

(57) ABSTRACT

The invention relates to a device (12) for mixing/dosing liquid coating materials, in particular for use in a coating system (10) for spectacle lenses, said device having at least a first and a second storage container (14-24) for liquid starting materials, a conveying device (26) for sucking in and expelling liquids, a mixing container (28), and a liquid outlet (30) for mixed/dosed liquid coating materials. In between there is a multi-way valve (32), which can be switched into different valve positions and is constructed to produce one of the following connections (a, b, c, d) and in the process to disconnect the other connections: (a) connection between the first storage container and the conveying device, (b) connection between the second storage container and the conveying device, (c) connection between the con-
(Continued)

veying device and the mixing container, and (d) connection between the conveying device and the liquid outlet.

20 Claims, 7 Drawing Sheets (51) Int. Cl.
*B01F 31/65* (2022.01)
*B29D 11/00* (2006.01)
B01F 33/84 (2022.01)
B01F 101/30 (2022.01)
B29C 35/08 (2006.01)
B29L 11/00 (2006.01)

(52) U.S. Cl.
CPC ............... *B01F 35/717613* (2022.01); *B29D 11/00009* (2013.01); B01F 33/84 (2022.01); B01F 2101/30 (2022.01); B29C 2035/0827 (2013.01); B29L 2011/0016 (2013.01)

(58) Field of Classification Search
CPC ............. B01F 31/651; B29D 11/00009; B29D 11/00884; Y10T 137/86501; Y10T 137/0419; Y10T 137/4259
USPC ......... 222/135, 144, 144.5, 282; 137/625.11, 137/111; 118/52
See application file for complete search history.

(56) References Cited

U.S. PATENT DOCUMENTS

| | | | | |
|---|---|---|---|---|
| 5,261,451 | A * | 11/1993 | Spencer | G05B 19/46 137/625.21 |
| 5,770,259 | A | 6/1998 | Parker et al. | |
| 7,014,664 | B2 | 3/2006 | Inuzuka | |
| 7,080,936 | B1 * | 7/2006 | Simpson | B01F 35/8822 366/162.3 |
| 8,740,996 | B2 | 6/2014 | Burguiere et al. | |
| 9,366,241 | B2 * | 6/2016 | Tschanz | H02K 7/06 |
| 10,286,399 | B2 * | 5/2019 | Porter | B01F 35/2209 |
| 10,780,470 | B2 * | 9/2020 | Saier | F16K 11/085 |
| 11,389,843 | B2 * | 7/2022 | Saier | A47L 15/449 |
| 11,813,647 | B2 * | 11/2023 | Saier | D06F 39/02 |
| 2002/0059945 | A1 * | 5/2002 | Maiefski | B01L 3/0217 134/25.1 |
| 2003/0095897 | A1 * | 5/2003 | Grate | G01N 33/54333 422/186 |
| 2005/0037517 | A1 * | 2/2005 | Anderson | G01N 35/1097 422/539 |
| 2005/0244299 | A1 * | 11/2005 | Dasgupta | G01N 35/1004 422/68.1 |
| 2007/0117212 | A1 * | 5/2007 | Kautz | B01L 3/502784 436/137 |
| 2008/0047488 | A1 | 2/2008 | Minor et al. | |
| 2011/0154864 | A1 * | 6/2011 | Schulze | D06F 39/022 68/17 R |
| 2016/0008815 | A1 * | 1/2016 | Porter | B01F 35/2113 435/286.7 |
| 2016/0008836 | A1 | 1/2016 | Nakamura et al. | |
| 2017/0144155 | A1 * | 5/2017 | Bohm | B01L 7/52 |
| 2018/0066559 | A1 * | 3/2018 | Haverkamp | B01F 25/3141 |
| 2020/0078751 | A1 * | 3/2020 | Schuster | B01F 35/2115 |
| 2020/0346257 | A1 * | 11/2020 | Saier | D06F 39/02 |

OTHER PUBLICATIONS

International Search Report for Application No. PCT/EP2018/000586 dated Apr. 5, 2019 (15 pages).
English translation of International Preliminary Report on Patentability for PCT/EP2018/000586 dated Jul. 9, 2020 (8 pages).

* cited by examiner

FIG. 11 ced by the plastics material used as well as the age thereof, so that even in this procedure reproducibility of defined colorations appears problematic. Moreover, it is a very lengthy method as a consequence of the times needed for the individual process steps, which is an obstacle to use on an industrial scale.

DEVICE FOR MIXING AND/OR DOSING LIQUID COATING MATERIALS, COATING SYSTEM HAVING SUCH A DEVICE, AND METHOD FOR COLORING OPTICAL GLASSES

TECHNICAL FIELD

The present invention relates generally to a device for mixing and/or metering liquid coating materials, to a coating system or plant, which comprises such a device, for individual coating of substrates and to a method for individual coloring of optical glasses. In particular, the invention relates to a device for the mixing and/or metering of colors for a coating system for spectacle lenses and to a method for individual coloring of spectacle lenses.

If in the following in connection with the coating of substrates there is mention by way of example—for liquid coating materials—of colors which are mixed, metered or applied to a substrate then this is not to be understood as restricted to colors, but is also to embrace other liquid coating materials such as polychromatic substances for the darkening of optical glasses, clear base coatings (so-called primers), clear hard lacquers, etc., insofar as these are to be metered and/or mixed from several components.

PRIOR ART

In order to protect eyes from unpleasant or harmful effects of sunlight, spectacle lenses are colored or toned, which reduces light permeability of the spectacle lenses relative to the eyes of the spectacle wearer. The individual desired coloration, which is often also subject to influences of fashion, of the spectacle wearer can in that case be very different. Moreover, it is widespread practice to selectively reduce individual constituents of light (for example blue component) or invisible constituents of light (ultraviolet light radiation) by specific colorations or coatings.

Various methods of coloring spectacle lenses are already known in the prior art. Thus, spectacle lenses of mineral glass can be colored even in the melting process by addition of a dye or later by vapor deposition of absorbent layers. The coloration of spectacle lenses of plastics material is usually carried out by dipping in an immersion bath with an aqueous dye solution, for which textile colors are usually used. The coloration in that case arises through diffusion of the dye into the plastics material of the spectacle lens or in a coating which was previously applied to the plastics material and which is suitable for absorbing corresponding dyes. In that regard, the intensity of the coloration is dependent on different factors such as reaction time, temperature and dye concentration present in the immersion bath. Accordingly, it is necessary to manually remove the spectacle lenses from the immersion bath during the process and visually check them in order to obtain the desired coloration, which is incompatible with full automation of the immersion principle. In addition, attainment of a specific coloration is strongly dependent on the experience of the personnel employed for that task, so that reproducibility of a specific coloration is problematic. Moreover, individual color tones for individual lenses or lens pairs cannot be economically realized by this method, since an immersion bath with a specific color composition would have to be maintained or planned for each individual color tone.

An alternative method for coloring spectacle lenses of plastics material is known from document EP 1 388 607 A2, which is based on the sublimation and precipitation of a dye on the spectacle lens, which is to be colored, with subsequent diffusion of the dye into the plastics material of the spectacle lens. The diffusion procedure is in that case influenced by the plastics material used as well as the age thereof, so that even in this procedure reproducibility of defined colorations appears problematic. Moreover, it is a very lengthy method as a consequence of the times needed for the individual process steps, which is an obstacle to use on an industrial scale.

Further, it is proposed in document JP 09-099494 A to directly print the spectacle lenses with a color by an ink-jet printer. As an alternative thereto, document WO 2006/079715 A1 discloses a method in which the spectacle lenses are initially provided with a printable base coating (primer) before they are individually colored by ink-jet printing of the primer. In both methods, dyes or pigments are bound to the lens surface by addition of a binder or resin. It is possible with both methods to produce coloring or toning progressions (gradients). However, a problem with this procedure is that half-tone or pixelated color coatings, which usually are not desired, are produced during the printing as a consequence of the method.

In addition, a method for coloration of optical lenses is described in document EP 1 683 645 A1, in which a layer which is printable and simple to remove again is applied to a lens. This layer is then printed by an ink-jet printer and, after diffusion of the dye through the layer into the lens has taken place, is removed again from the lens. However, this method also requires an extended time, which again conflicts with industrial use.

In order to produce uniformly colored spectacle lenses it is proposed in document DE 695 35 130 T2 to apply, for example by spin coating or dip coating, a liquid and hard-enable coloring, which contains a coloring material, to a surface or all surfaces of a spectacle lens and to then harden this coating by ultraviolet light, in which case the coloring dyes or pigments can be used either in the base coating or in the hard coating of the spectacle lens or in both. Finally, hard lacquers of that kind also serving as dye carriers are also described in document KR 100807001 B1. Details with respect to the construction and function of suitable mixing devices or coating systems cannot, however, be inferred from these documents.

What is desired is a device of simplest possible construction for mixing and/or metering liquid coating materials, particularly for a coating system for spectacle lenses, which makes it possible to mix or meter liquid coating materials in a satisfactorily reproducible manner and which is suitable for use particularly in an automated, fast and economic method for individual coloration even of individual spectacle lenses. What is also desired is a coating system for individual coating of substrates such as spectacle lenses and indication of a method for individual coloring of optical glasses, namely spectacle lenses.

A device according to one aspect of the invention for mixing and/or metering liquid coating materials, particularly for a coating system for spectacle lenses, comprises at least one first and at least one second storage container for liquid starting materials, a conveying device for sucking up and expelling liquids, a mixing container, a liquid outlet for mixed and/or metered liquid coating materials and a multi-way valve, which is arranged therebetween and which is switchable into different valve settings and adapted to produce one of the following connections and in that case separate the respective other connections: (a) connection between the first storage container and the conveying device, (b) connection between the second storage container and the conveying device, (c) connection between the conveying device and the mixing container, and (d) connection between the conveying device and the liquid outlet.

In other words, in a device according to the invention for mixing and/or metering liquid coating materials all liquid movements necessary for metering or mixing liquid coating materials are produced by a single conveying device for sucking up and expelling liquids, which can be connected by way of the multi-way valve with always only one of the above-listed containers or the liquid outlet so as to suck up a liquid or deliver a liquid by way of the respective connection. Since in that case all non-connected connections are separated or blocked by the multi-way valve, no further valves are needed for the metering and/or mixing, so that the device can be of particularly simple, compact and economic design.

In addition, a device of that kind can be automated in particularly simple manner, because merely the multi-way valve has to be switched and the conveying device actuated in order to suck up or expel a defined liquid volume.

The fact that for mixing and/or metering only the one multi-way valve and the one conveying device are used is additionally conducive to a rapid mixing or metering process and good reproducibility of the mixing result, because it is not necessary to co-ordinate or synchronize several components with respect to conveying quantities and times, which harbors the risk of errors in metering. Moreover, a simply constructed device of that kind is less susceptible to disturbance, can be cleaned and serviced in problem-free manner and can be integrated with little effort in a coating system.

Not least, the device according to one aspect of the invention with the afore-described construction thereof is particularly appropriate for mixing and metering liquid coating materials in very small quantities, as has been shown by the inventors in connection with tests carried out for coloration of individual spectacle lenses.

In principle, it is conceivable to construct the conveying device with, for each conveying direction, a constant pump such as, for example, a diaphragm pump or piston pump, which conveys into or out of a common intermediate store. However, a design is preferred in which the conveying device comprises a syringe pump with a syringe cylinder and a syringe piston which is positionable with respect to the syringe cylinder by a stroke drive. A syringe pump by virtue of its construction conveys in both directions, in which case a flow direction reversal advantageous for a mixing process is simple to manage. Moreover, liquids can be metered very accurately by a syringe pump. In addition, syringe pumps have a high level of tightness—even relative to air—which is conducive to high process reliability. Furthermore, the syringe cylinder serves, during conveying, as an intermediate store for the conveyed liquid volume, which is simple to calculate with knowledge of the cross-section of the syringe cylinder and the stroke of the syringe pump, so that separate detection of the conveyed liquid volume is redundant.

In principle, it is possible to use as the stroke drive, for example, a simple crank drive. Solutions with a linear motor or a piston-cylinder arrangement for stroke generation are also conceivable. However, with respect to not only low costs, but particularly also a particularly good capability of metering the conveyed liquid it is preferred if the stroke drive comprises an electric motor which is in drive connection with the syringe piston by way of a transmission mechanism capable of converting a rotational movement into a longitudinal movement. Very sensitive movements of the syringe piston can be realized through suitable selection of a transmission ratio of the transmission mechanism so that the liquid volume to be conveyed can be set very accurately. With particular preference the electric motor can be a stepping motor which can be very accurately positioned without a sensor for positional feedback. Depending on the respective step width (rotational angle) of the stepping motor and on the design of the transmission ratio of the transmission mechanism even very small conveyed quantities can be conveyed by the syringe pump with good reproducibility.

Fundamentally, the mixing container can be of any desired construction, for example it can have a spherical shape. However, with respect to particularly satisfactory and rapid mixing of the liquid starting materials to form the liquid coating material it is preferred if the mixing container comprises a mixing funnel. Due to the constant transition from a large to a small cross-section, formation of turbulence promoting mixing arises during suction of the liquid coating material from the mixing funnel. This is also of advantage for cleaning the mixing funnel. Such a mixing funnel is, in addition, simple and economic to produce.

The internal surfaces, i.e. those wetted by the liquid coating material, of the mixing funnel can in principle be untreated or ground to bare state. However, in a preferred embodiment it is provided that the internal surfaces of the mixing funnel are electro polished or have an anti-adhesion coating such as, for example, Teflon (Registered Trade Mark) or other FEP coating. This advantageously not only facilitates cleaning of the mixing funnel, but also improves the mixing result by virtue of a more pronounced formation of turbulence to accompany the achieved lower friction.

Similarly, different designs are conceivable for the multi-way valve. Thus, the multi-way valve can be a longitudinal slide valve or a valve manifold. However, with respect to, in particular, an especially compact construction a design is preferred in which the multi-way valve comprises a distributor housing with connectors for the storage containers, the mixing container, the liquid outlet and the conveying device as well as a valve body which is rotatably received in the distributor housing and has a connecting channel, which depending on the rotational setting of the valve body in the distributor housing is capable of connecting the connector for the conveying device with one of the connectors for the storage containers, the mixing container and the liquid outlet. A multi-way valve of such a construction is distinguished not only by the fact that it has merely one movable part (the valve body), but also by the fact that it can be cleaned very easily, since all liquids are conducted via the same connection channel in the rotatable valve body. Moreover, such a multi-way valve advantageously has small dead volumes, short setting paths and short, constant liquid paths.

Although manual adjustment of the valve body of the multi-way valve can be provided it is preferred if the valve body of the multi-way valve is rotatable by an electric motor in the distributor housing, which advantageously enables automatic adjustment of the valve body. In that regard, it is possible to use as drive, for example, a stepping motor connected directly or by way of a transmission coupling.

In an advantageous embodiment of the device for mixing and/or metering it can additionally be provided that a filter can be associated with each storage container, the filter being disposed upstream of the multi-way valve. Any contaminations or agglomerations of the liquid starting materials thus cannot pass to the multi-way valve and cause a blockage thereat. In that regard, the storage containers can optionally be loaded with pressure so that the liquid starting materials are urged through the filter without drawing a sub-atmospheric pressure. In addition, a filter can be arranged between the multi-way valve and the liquid outlet in order to filter the liquid coating materials prior to the coating.

In a first alternative the afore-described device for mixing and/or metering can be constructed as a mixing device separate from a coating system so that, for example, it can be used for different coating systems. However, in a second, particularly preferred alternative the device for mixing and/or metering can also be integrated in a coating system for individual coating of substrates, particularly spectacle lenses, the system comprising a substrate holder for holding the substrates during coating and a coating chamber, wherein the liquid outlet of the device for mixing and/or metering opens by way of a nozzle into the coating chamber so as to deliver the liquid coating material, which is mixed and/or metered in the device, in the direction of the substrate holder, which can be constructed as, for example, a suction head. In that case, the nozzle preferably forms a defined closure of the liquid outlet of the device, which predetermines the direction for delivery of the liquid coating material to the substrate and in that case targets the center of the respective substrate. The nozzle can then have a free cross-section widening in flow direction so as to homogenize the output of the liquid coating material.

A physical integration of the device for mixing and/or metering in the coating system has, in particular, the advantage that the liquid coating materials mixed in the device can be used directly in the coating system, as a result of which additional transport steps are eliminated and conveying paths as well as process times can be advantageously shortened. In addition, a common control for the device for mixing and/or metering and the coating system can be provided. Ultimately, a coating system equipped in that way is particularly appropriate for fully automated production.

A number of measures is conceivable for preventing unintended coating of the substrate, for example directly after cleaning of the device for mixing and/or metering. Thus, for example, the substrates can be moved by the substrate holder of the coating system out of the coating chamber or the position of the nozzle in the coating chamber is changed in such a way that coating of the substrate is excluded. However, it is preferred, particularly with respect to a simple design of the coating system and short processing times, if there is associated with the nozzle in the coating chamber a diverter device which is selectably movable from a diverting position, which prevents unintended coating of the substrate, between the nozzle and the substrate holder into a clearance position, in which the diverter device is not disposed between the nozzle and the substrate holder, and conversely.

In principle, the diverter device for covering the nozzle can comprise a slider which is, for example, linearly movable and which is driven, for example, by an electric motor. However, in order to achieve a compact arrangement and a high level of functional reliability it is preferred if the diverter device comprises a flap pivotable by a pneumatic cylinder. The flap can in that case be pivoted, for example, by way of a shaft which projects from outside into the coating chamber and which—by contrast with a guide mechanism in the case of a linear movement—can be easily protected from disturbing influences due to liquid coating materials which may harden. Further, pneumatic cylinders are very inexpensive by comparison with equally conceivable electric drives and in any case compressed air is usually present in a coating system.

The afore-described device for mixing and/or metering is in principle suitable for integration in any coating system using liquid coating materials, i.e. such a coating system which operates on any desired coating principle, for example dip coating or ink-jet printing. However, it is particularly preferred if the coating system is a rotary coating system distinguished particularly by the possibility of producing very uniform or homogenous coatings as well as short processing times during coating.

In further pursuance of the concept of the invention a method for individual coloring of optical glasses, namely spectacle lenses, in which, in particular, the afore-described coating system can be used, comprises the following method steps: (i) providing a spectacle lens or a spectacle lens pair; (ii) selecting an individual color for the spectacle lens or the spectacle lens pair from a number of colors, for the mixing of which a respective mixing ratio of different starting colors is known; (iii) metering the provided different starting colors in sub-quantities, which are needed for mixing the selected individual colors in correspondence with the known mixing ratio, for a total quantity just sufficient for coloring the spectacle lens or the spectacle lens pair; (iv) mixing the metered sub-quantities of starting colors in order to obtain a mixed total quantity of the selected individual colors; and (v) coating the spectacle lens or the spectacle lens pair with the mixed total quantity of the selected individual colors.

By contrast to the afore-described prior art, there is thus no need for different coloring pots as immersion baths for coloration of spectacle lenses, with the problems connected therewith, particularly with regard to the reproducibility of specific colorations. Rather, individual mixing of the desired individual color in correspondence with the mixing ratio known for that purpose is carried out in a smallest quantity, namely such a quantity as just suffices for coating of the respective spectacle lens or the respective spectacle lens pair and no more. Thus, by comparison with the prior art, an incomparably higher number of individual desired colors can be realized in problem-free manner and with lower cost. The reproducibility of specific color tones is in that case particularly good, because it does not depend on the skill of the personnel used for the coloring and subjective color impressions, but is achieved objectively by virtue of the known mixing ratio. Moreover, there is no risk of change of the color due to environmental influences and/or ageing, since the respective individual color is mixed synchronously on a need basis exactly for the respective coating process. Not least, the method according to the invention can be readily automated for individual coloring, so that it is particularly suitable for individual coloring of optical glasses on an industrial scale.

BRIEF DESCRIPTION OF THE DRAWINGS

The invention is explained in more detail in the following on the basis of a preferred embodiment with reference to the accompanying, partly schematic drawings, in which.

With respect to the drawings it is to be noted at this point that, in order to free a view of essential components or subassemblies of the coating system and of the device according to the invention for mixing and/or metering as well as for simplification of the illustration, parts of the cladding, doors, deposits for tools and operating substances, the supply devices (including lines, hoses and pipes) for power and compressed air as well as measuring, maintenance and safety devices, in particular, have been largely omitted, since they do not appear necessary for an understanding of the invention and are in any case familiar to the expert.

DETAILED DESCRIPTION OF THE EMBODIMENT

A rotary coating system or plant is illustrated in FIGS. 1 to 10 as an exemplification of a coating system 10 for individual coating of substrates, particularly spectacle lenses L, in which system according to FIGS. 2 to 10 a device, still to be described in more detail in the following, for mixing and/or metering liquid coating materials—called mixing device 12 for short in the following—is integrated.

Figure 2:
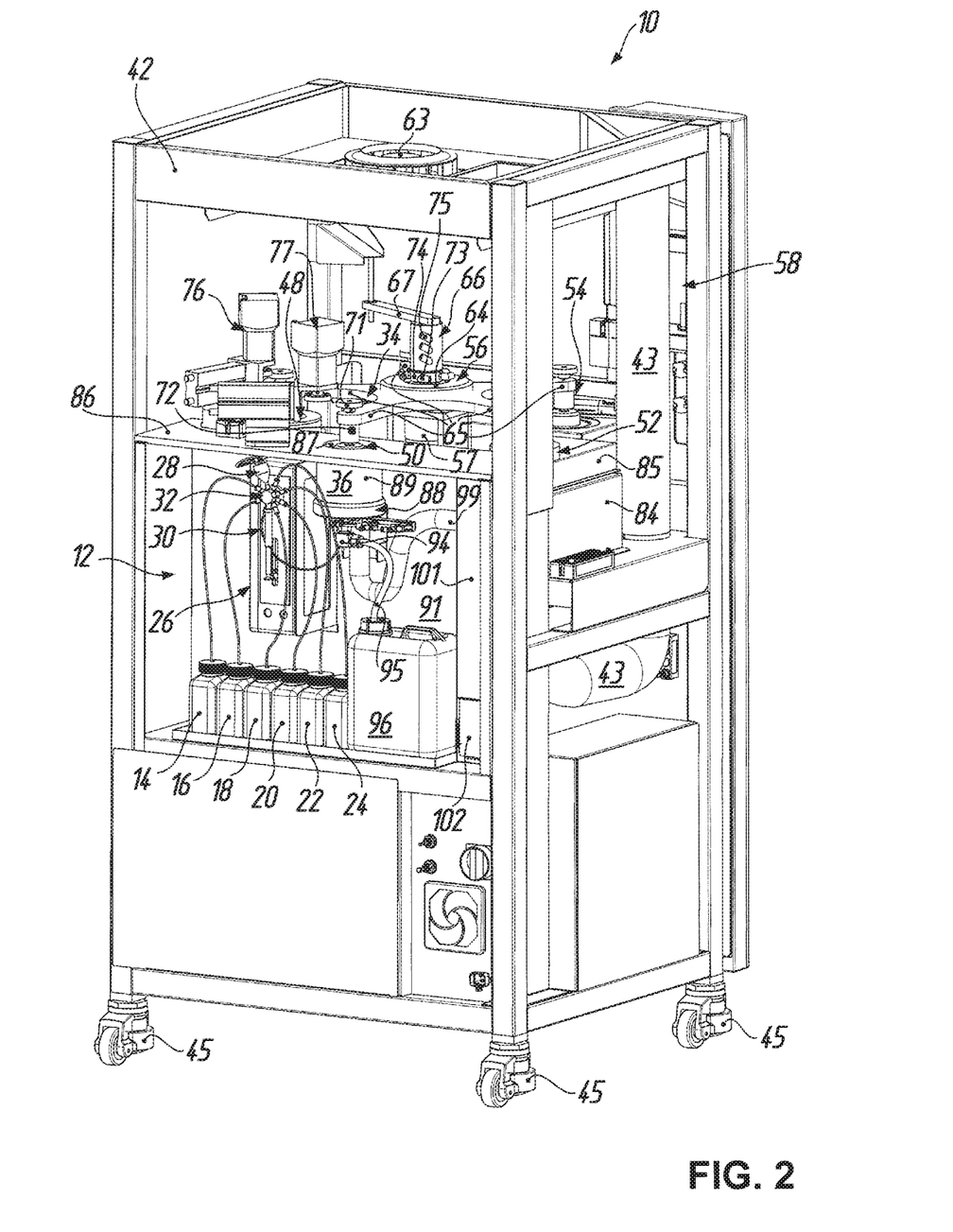
FIG. 2 shows a perspective view of the coating system according to FIG. 1 obliquely from above, back and left, with a view of the coating station and the device according to the invention, which is connected therewith, for mixing and/or metering, which in general comprises a plurality of storage containers for liquid starting materials, a conveying device for sucking up and expelling liquids, a mixing container, a liquid outlet, which opens into a coating chamber of the coating station, for mixed and/or metered liquid coating materials as well as a multi-way valve arranged therebetween.
Figure 3:
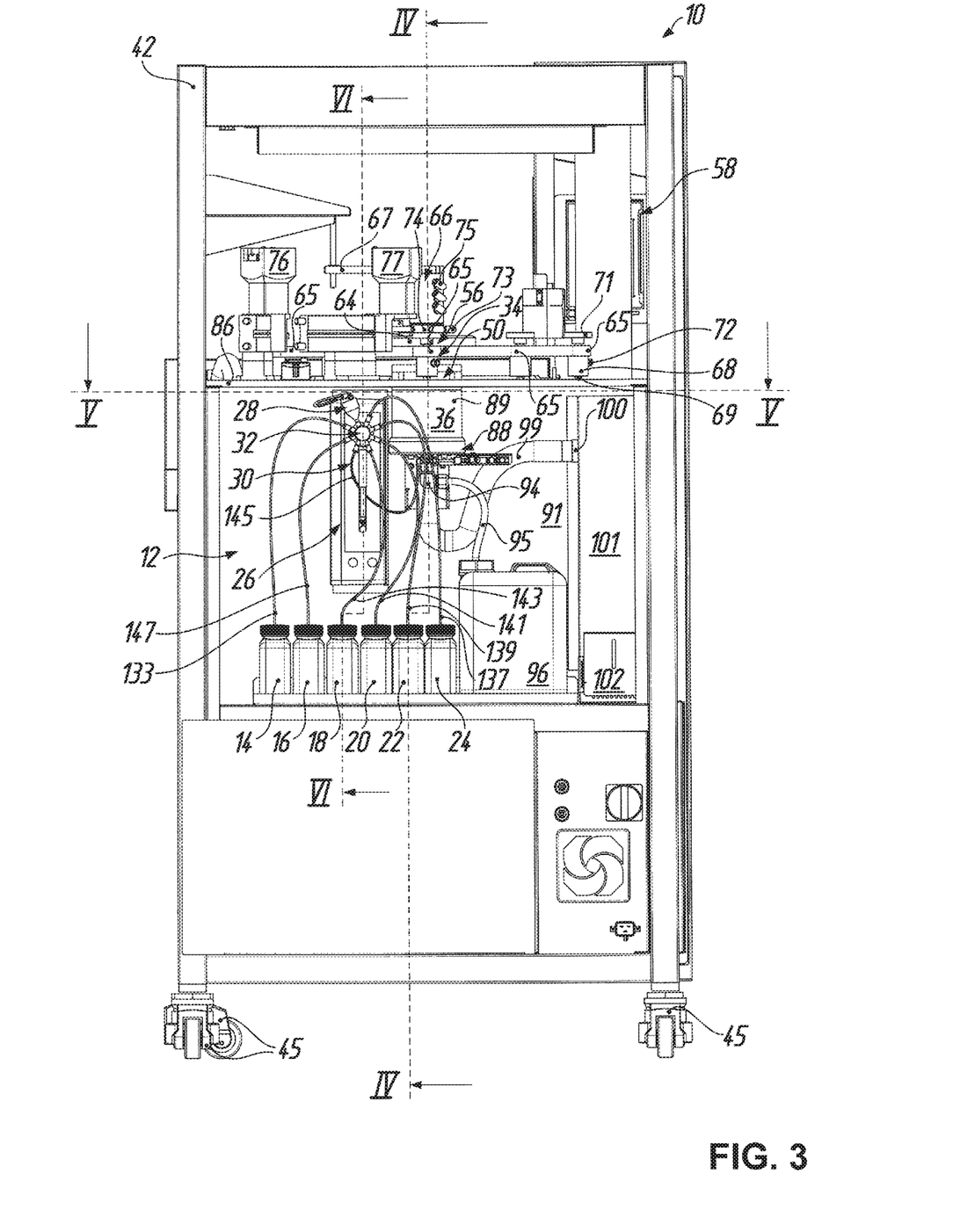
FIG. 3 shows a rear view of the coating system according to FIG. 1.

The mixing device 12 comprises in general at least one first storage container (14, 16) and at least one second storage container (18, 20, 22, 24) for liquid starting materials (solvent as well as clear and differently colored primers), wherein in the illustrated embodiment a total of six storage containers 14, 16, 18, 20, 22, 24 for—as seen from left to right in FIGS. 2 and 3—solvent (storage container 14), clear base coating (storage container 16), black-colored base coating (storage container 18), blue-colored base coating (storage container 20), red-colored base coating (storage container 22) and yellow-colored base coating (storage container 24) are provided.

Figure 4:
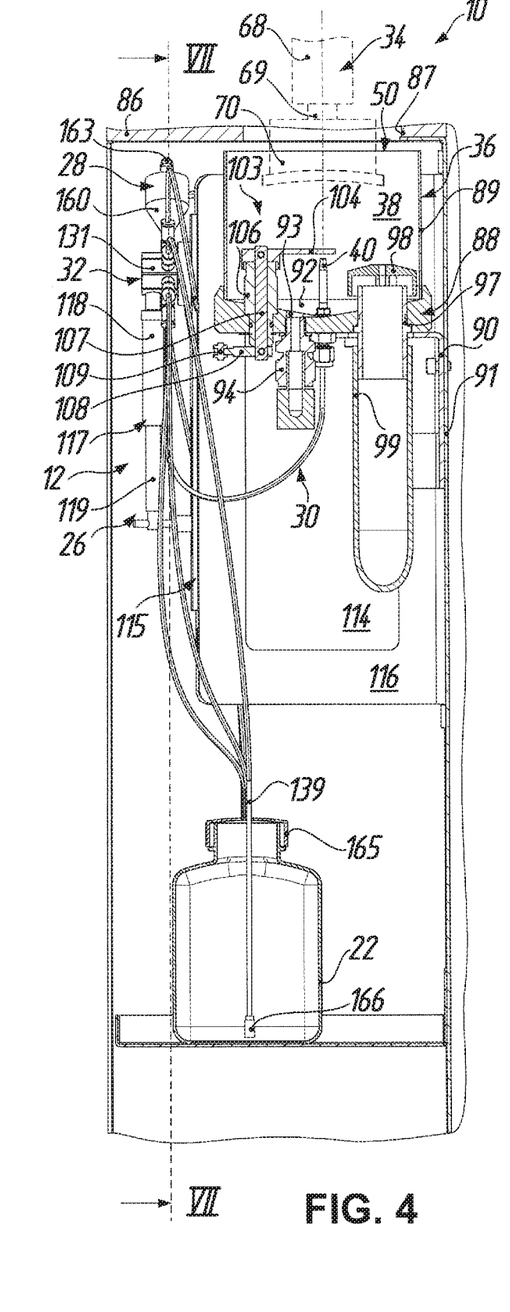
FIG. 4 shows a sectional view, which is enlarged by comparison with the scale of FIG. 3 and which is broken away upwardly, downwardly and to the right, of the coating system according to FIG. 1 in correspondence with the offset section line IV-IV in FIG. 3, with a view of a nozzle—which opens into the connecting chamber of the coating station and is connected with the liquid outlet—of the device according to the invention for mixing and/or metering, wherein the nozzle is arranged below a flap of a diverter device seated between the nozzle and a substrate illustrated in dashed lines.
Figure 6:
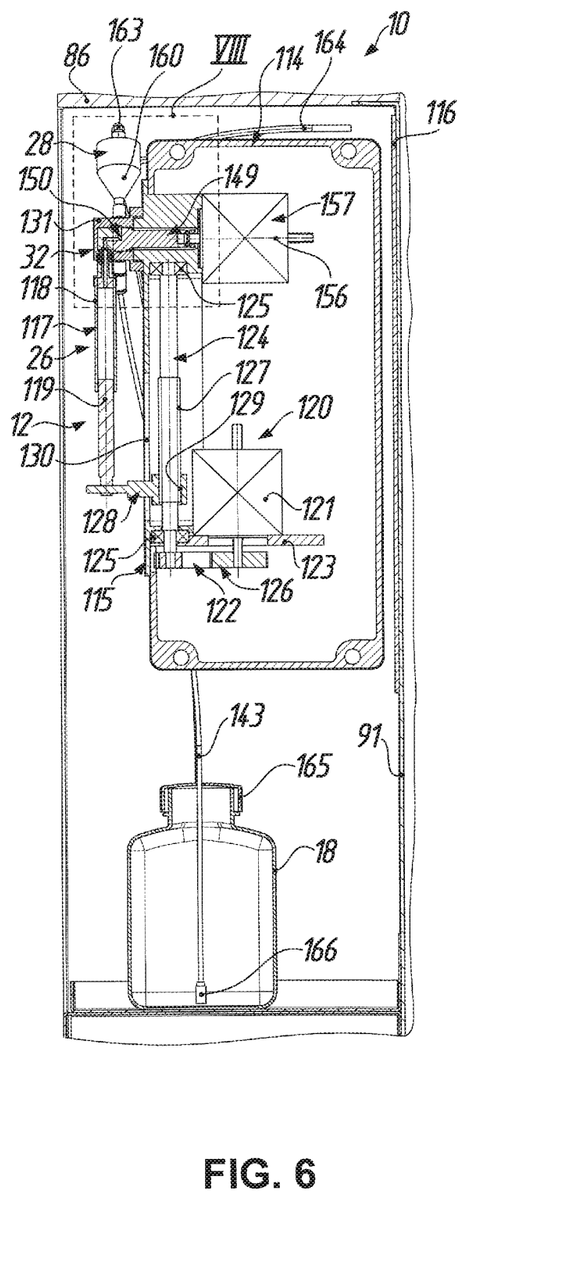
FIG. 6 shows a sectional view, which is broken away upwardly, downwardly and to the right, of the coating system according to FIG. 1 in correspondence with the offset section line VI-VI in FIG. 3 to the scale of FIG. 4, from which further details with respect to the conveying device and the multi-way valve of the device according to the invention for mixing and/or metering can be inferred.
Figures 7, 8:
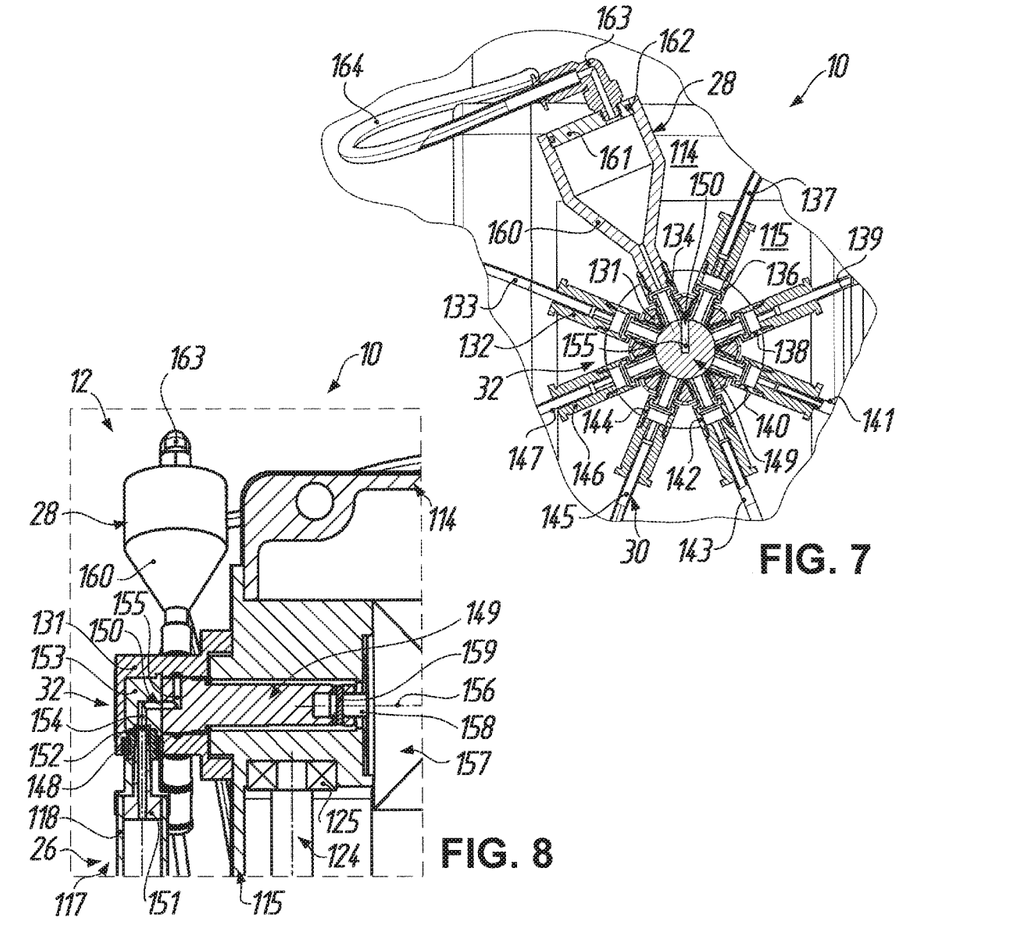
FIG. 7 shows a sectional view, which is enlarged by comparison with the scale of FIG. 4 and is broken away overall, of the coating system according to FIG. 1 in correspondence with the section line VII-VII in FIG. 4, for illustration of further details of the multi-way valve and of the mixing container of the device according to the invention for mixing and/or metering.
FIG. 8 shows an illustration, which is to enlarged scale, of the detail VIII in FIG. 6.
Figure 9:
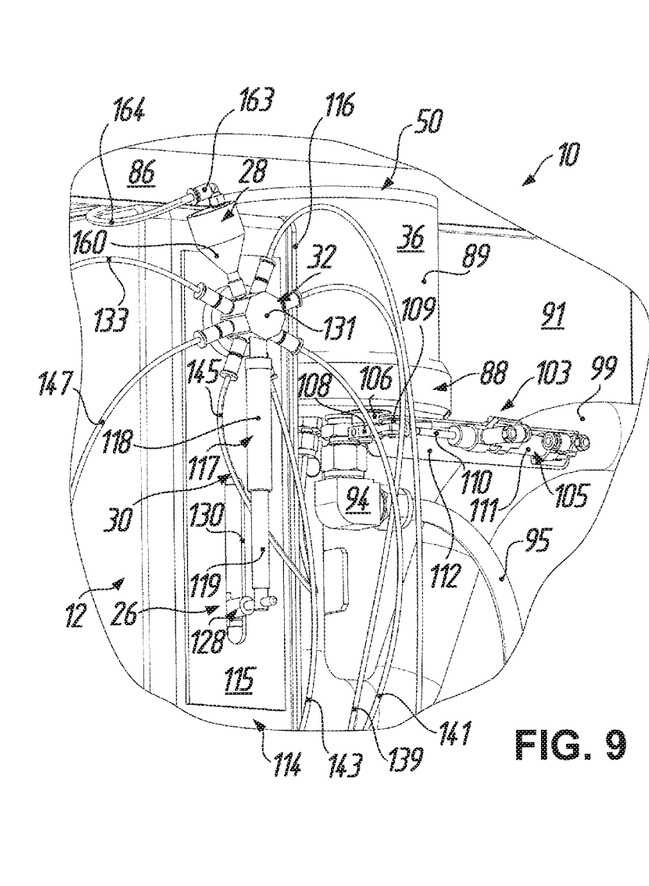
FIG. 9 shows a perspective view, which is enlarged by comparison with the scale of FIG. 2 and is broken away overall, of the coating system according to FIG. 1 obliquely from the back, below and the right, with a view of, in particular, the multi-way valve and the conveying device, which is constructed as a syringe pump, of the device according to the invention for mixing and/or metering.
Figure 10:
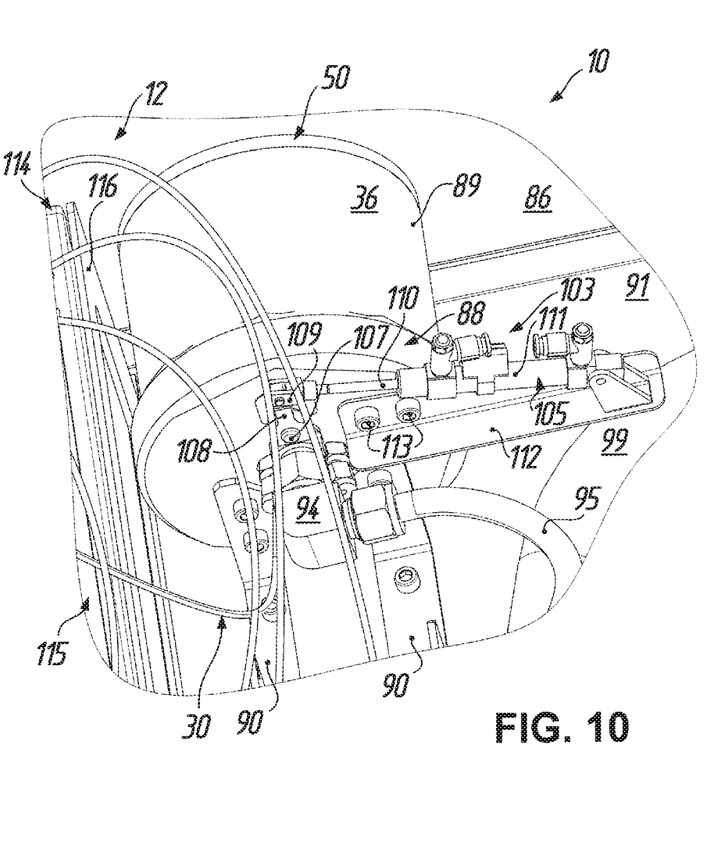
FIG. 10 shows a perspective view, which is enlarged by comparison with the scale of FIG. 2 and is broken away overall, of the coating system according to FIG. 1 obliquely from the back, below and the left, with a view of, in particular, a pneumatic cylinder for pivoting the flap of the diverter device.

In addition, the mixing device 12 has a conveying device 26, which is shown particularly in FIG. 6, for sucking up and expelling liquids, a mixing container 28, which is illustrated particularly in FIG. 7, and a liquid outlet 30, which can be best seen in FIG. 4, for mixed and/or metered liquid coating materials. Arranged therebetween is a multi-way valve (see, in particular, FIGS. 6 to 8), which is denoted generally by the reference numeral 32 and which can be switched into different valve settings and—as will similarly be explained in more detail in the following—is adapted to produce each of the following connections (a, b, c, d) and in that case separate the respective other connections: (a) connection between the respective first storage container 14 or 16 and the conveying device 26, (b) connection between the respective second storage container 18, 20, 22 or 24 and the conveying device 26, (c) connection between the conveying device 26 and the mixing container 28, and (d) connection between the conveying device 26 and the liquid outlet 30, thus in the embodiment shown here in total eight different connections.

With respect to co-operation of the mixing device 12 and coating system 10 it may additionally be mentioned in advance at this point that the coating system 10 in general comprises a plurality of substrate holders 34 for holding the spectacle lenses L (inter alia) during the coating and a coating chamber 38, which is bounded by a coating bowl 36 and into which in accordance with FIG. 4 the liquid outlet 30 of the mixing device 12 opens via a nozzle 40 so as to deliver the liquid coating material, which has been mixed and/or metered in the mixing device 12, in the direction of the substrate holder 34.

Figure 1:
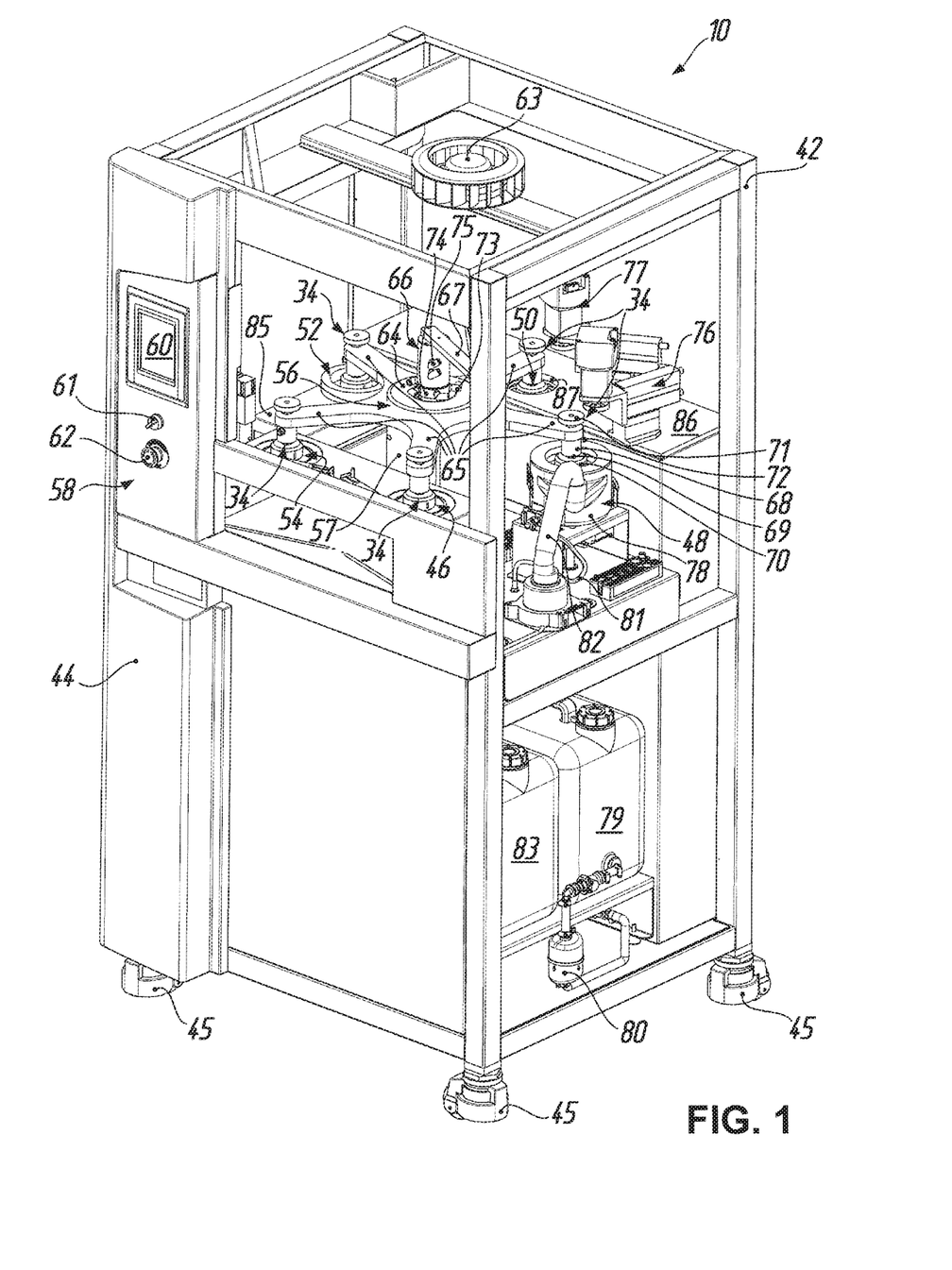
FIG. 1 shows a perspective view of a coating system or plant for individual coating of substrates, namely spectacle lenses, obliquely from above, front and right, with a substrate holder for holding the substrates during the coating and a coating station, with which a device according to the invention for mixing and/or metering liquid coating materials is connected.

According to FIGS. 1 to 3 the coating system 10 has a frame 42 which supports and encloses the different components of the coating system 10 and for that purpose comprises a plurality of girders and struts which are connected together in a box-like configuration. Cladding parts are secured to the frame 42 therearound and prevent contaminants from being able to pass into the interior of the coating system 10, the interior—in operation of the coating system 10—being subject to a slight sub-atmospheric pressure generated by a fan which is provided in the base region of the coating system 10, but which is not illustrated in the figures themselves. However, exhaust pipes 43 connected with this fan are shown in FIG. 2. In addition, the aforementioned cladding parts are mostly omitted in the figures so as to afford a view into the interior of the coating system 10. By way of example, for these cladding systems, a front plate 44 which covers a part of the front side of the frame 42 is shown in FIG. 1.

The frame 42 is additionally provided on its underside at all four corners with height-adjustable roller feet 45 by way of which the coating system 10 can on the one hand be simply and safely moved. On the other hand, the roller feet 45 at the respective installation location ensure a stable stance of the coating system 10 and enable exact height adjustment, in particular so as to level, i.e. bring into the horizontal, the coating system 10 for a problem-free centrifugal coating process (so-called 'spin coating').

Within the frame 42 the coating system 10 comprises a number of work stations for carrying out one or more operations on the spectacle lenses L. In the first instance, a loading station 46 by way of which the spectacle lenses L are loaded into the coating system 10 is provided. The reference numeral 48 denotes a washing station in which the spectacle lenses L are washed and dried. With the reference numeral 50, the coating system 10 embraces a coating station with the coating bowl 36 in which the coating is applied to the spectacle lenses L by spin coating.

Following that is a hardening station 52 for drying and hardening the coating, which has been applied to the spectacle lenses L, by ultraviolet radiation. Finally, an unloading station 54 by way of which the finished spectacle lenses L are transported out of the coating system 10 is provided.

For transport of the spectacle lenses L from work station to work station the coating system 10 comprises a carousel 56, which is described in more detail in the following and which on the one hand can be rotated about a vertically extending axis of rotation by a rotary drive 57 arranged below the carousel 56. On the other hand, the carousel 56 can be raised and lowered along the axis of rotation by a preferably pneumatic or hydraulic stroke mechanism, which is not illustrated in the figures.

The operation of the carousel 56 and of the individual work stations 46, 48, 50, 52 and 54 as well as the integrated mixing device 12 is controlled by a central control unit 58. According to FIG. 1 the control unit 58 comprises a touch-screen 60 for the input of operating parameters and the display of status data of the coating system 10. An on/off-switch 61 and an emergency off-switch 62 are illustrated in FIG. 1 as further control elements of the control unit 58.

In order to maintain an clean environment within the coating system 10 and thus avoid, in particular, particles being able to pass into the interior of the coating system 10, which could lead to contamination of the coated spectacle lenses L, according to FIGS. 1 and 2 there is mounted on the upper side of the frame 42 at a central location a centrifugal fan 63 which for the cleaning of air co-operates with a high-efficiency sub-micron particulate air filter (not shown), which is arranged below the centrifugal fan 63, of HEPA type so that—also as a consequence of the sub-atmospheric pressure (see above) prevailing in the interior of the coating system 10—particle-free air is circulated in the interior of the coating system 10.

As can additionally be inferred from FIGS. 1 and 2, the carousel 56 has an inner hub section 64 from which—in correspondence with the number of work stations 46, 48, 50, 52, 54—a total of five equal-length arms 65 extend, the arms being angularly spaced at the same distance from one another about the hub section 64. A rotary feedthrough 66 is arranged above the hub section 64 of the carousel 56 and is in turn supported relative to the frame 42 at an upper stationary part by way of a frame securing element 67 acting as a torque brace.

At the free ends of the arms 65, which are remote from the hub section 64 of the carousel 56, a respective one of the substrate holders 34 is mounted on each arm 65. More specifically, each substrate holder 34 comprises, particularly in accordance with FIGS. 1 (righthand side), 3 (righthand side) and 4 (in dashed lines), a housing section 68 which is fixedly connected with the free end of the respective arm 65. A drive shaft 69 is rotatably mounted in the housing section 68. A rubber-elastic suction cup 70, which is surrounded by a splash guard and which is illustrated in the figures merely schematically, is fastened to a lower end of each drive shaft 69. Conversely, a discoid magnetic coupling 71 is mounted on an upper end, which extends through the respective arm 65, of each drive shaft 69.

The reference numeral 72 denotes in FIGS. 1 to 3 a sub-atmospheric pressure connector which is provided at each housing section 68 and by way of which a sub-atmospheric pressure can be applied to the respective suction cup 70 so as to suck up and hold the spectacle lens L in a manner known per se (cf. FIG. 4). The sub-atmospheric pressure connectors 72 are connected by way of sub-atmospheric pressure hoses (not shown in the figures) with associated sub-atmospheric pressure connectors 73 of a distributor section 74, which is rotatable together with the carousel 56, of the rotary feedthrough 66. The distributor section 74 for its part is connected with a source of sub-atmospheric pressure (not illustrated) by way of sub-atmospheric pressure connectors 75 at the upper, stationary part of the rotary feedthrough 66.

In addition, a rotary drive arrangement 76 and a rotary drive arrangement 77 are respectively associated with the washing station 48 and the coating station 50, the arrangements being adapted to co-operate with the magnetic couplings 71 of the substrate holder 34 and serving the purpose, in a manner known per se, of rotationally driving the drive shaft 69 at the respective substrate holder 34 by way of the magnetic coupling 71 when the respective substrate holder 34 is present at the washing station 48 or the coating station 50.

With respect to the kinematics of the coating system 10 at the substrate side it is to that extent evident to the expert that the spectacle lenses L to be coated can be held by the suction cups 70 through sub-atmospheric pressure at the substrate holders 34, which in turn are movable from work station to work station by way of rotation of the carousel 56 and can be lowered into the respective work station and lifted out of the respective work station through a stroke movement of the carousel 56. In addition, the spectacle lenses L held in the substrate holders 34 can be rotated about their individual axes in the washing station 48 and the coating station 50 by the rotary drive arrangement 76 or 77 by way of the respective magnetic coupling 71.

With respect to the washing station 48 it can be additionally inferred from FIG. 1 that the washing station 48 comprises a washing container 78 in which the rotationally driven spectacle lenses L are washed by a washing water. The washing water is in that case conveyed from a container 79, which is arranged below the washing station 48, for washing water via a filter 80 by a pump (not shown) through a washing water feed hose 81 into the washing container 78.

Further, of the washing station 48 there can be seen in FIG. 1 suction device 82 connected with the washing container 78 and a container 83 for waste water.

FIG. 2 shows, to begin with, of the hardening station 52 a light box 84 which is covered by a cover 85. According to FIG. 1, the cover 85 has on its upper side an opening through which the spectacle lenses L held at the substrate holder 34 can be lowered by way of the carousel 56 into the light box 84. Arranged in the light box 84 is an ultraviolet lamp (not shown) which serves the purpose of irradiating and hardening the coating applied to the spectacle lenses L in the coating station 50. A rotary drive arrangement (not illustrated here) can optionally also be provided at the hardening station 52 in order to rotate the spectacle lenses L by way of the magnetic coupling 71 of the respective substrate holder 34 during hardening of the coating. The hardening can, moreover, be carried out in an inert atmosphere ($CO_2$ or $N_2$).

Before further details of the coating station 50 shall be described in more detail on the basis of FIGS. 2 to 5, 9 and 10 it may be mentioned at this point that further details with respect to the construction and function of the coating system 10 so far described can be inferred from document U.S. Pat. No. 2,008,035 053 A1, to which express reference is made at this point.

As can be best seen in FIG. 4, the coating bowl 36, which arranged below a horizontal partition wall 86 of the coating station 50, is accessible from above via an opening 87 in the partition wall 86. The spectacle lens L held at the suction cup 70 of the respective substrate holder 34 can thus be selectably lowered by the carousel 56 through the opening 87 into the coating bowl 36, as shown in FIG. 4 so as to lie opposite the nozzle 40 of the mixing device 12.

The coating bowl 36 generally comprises a base section 88 and a hollow-cylindrical wall section 89 secured thereto, which together bound, respectively downwardly and laterally, the coating chamber 38. The base section 88 of the coating bowl 36 is mounted on a vertical partition wall 91 of the coating system 10 by way of two fastening brackets 90 (see also FIG. 10). The base section 88 of the coating bowl 36 is provided on its upper side with a substantially conical cut-out 92 forming at the base section 88 a trough-like depression, at the lowest point of which a drain 93 is formed. The constantly open drain 93 is connected by way of a connecting bracket 94 with a drain hose 95 leading to a waste container 96, which is arranged near the storage container 24, for liquid waste substances.

According to FIG. 4, in addition a pipe section 97 of a suction device for solvent vapors is suitably sealably fastened in a passage bore in the base section 88 of the coating bowl 36 and projects not only upwardly, but also downwardly beyond the base section 88. A cap 98 is placed from above on the pipe section 97 and according to FIG. 4 covers the pipe section 97 upwardly, at the same time allowing the pipe section 97 a free cross-section for passage of the solvent vapors. A suction hose 99 is plugged by one end from below onto the pipe section 97. As can be best seen in FIG. 3, the other end of the suction hose 99 is connected by way of a stub pipe 100 with an exhaust duct 101, which in turn communicates with the afore-mentioned fan (not shown) in the base region of the coating system 10. A slider 102 provided in a lower region of the exhaust duct 101 enables change of the sub-atmospheric pressure in the exhaust duct 101, by way of which it is possible to influence the thickness of the coating applied in the coating bowl 36.

Figure 5:
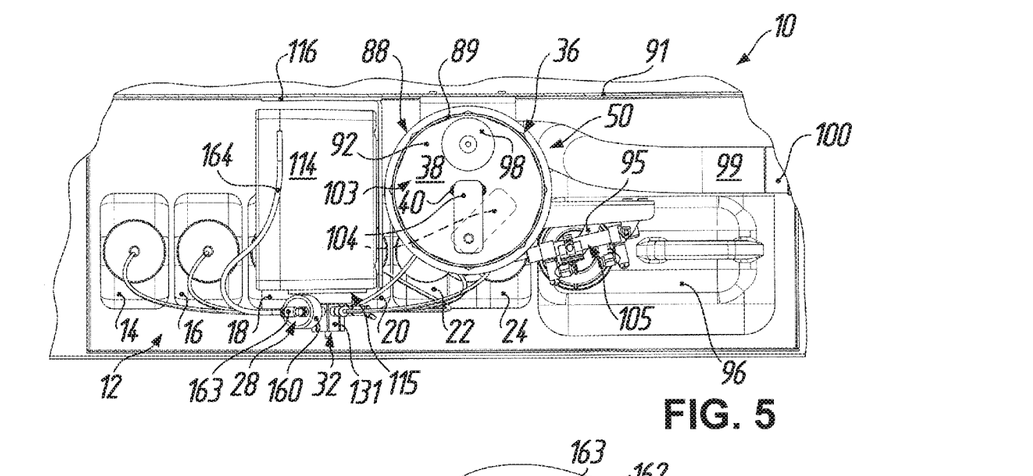
FIG. 5 shows a sectional view, which is broken away upwardly and on both sides, of the coating system according to FIG. 1 in correspondence with the section line V-V in FIG. 3 to the scale of FIG. 4, with a view of the base of the coating chamber and the flap of the diverter device in a diverting position preventing unintended coating of the substrate, wherein a clearance position of the flap in which the flap is not disposed between the nozzle and the substrate holder is illustrated by a dashed line.

As can be further inferred from, in particular, FIGS. 4 and 5, a diverter device 103 is associated with the nozzle 40 in the coating chamber 38 of the coating bowl 36 and can be moved selectably from a diverting position, which prevents unintended coating of the spectacle lenses L, between the nozzle 40 and the substrate holder 34 into a clearance position in which the diverter device 103 is not disposed between the nozzle 40 and the substrate holder 34, and conversely. In the illustrated embodiment the diverter device 103 comprises a flap 104 able to be pivoted by a pneumatic cylinder 105, which can be best seen in FIGS. 9 and 10.

More precisely, according to FIG. 4 a bearing tube 106 of the diverter device 103 is secured in suitably sealed manner in a stepped bore, which is formed in the base section 88 of the coating bowl 36 near the drain 93, and rotatably receives a cylindrical connecting pin 107 projecting at both sides beyond the bearing tube 106. The flap 104, which is substantially rectangular as seen in plan view (cf. FIG. 5) and which consists of an aluminum alloy, is suitably fastened, for example by a pin connection, to the end of the connecting pin 107 projecting into the coating chamber 38. On the other hand, a lever 108 is suitably mounted, for example again by a pin connection, by one end on the end, which projects downwardly beyond the bearing tube 106, of the connecting pin 107. At its other end, the lever 108 is pivotably connected with a forked head 109, which can be best seen in FIG. 10 and which is secured to a piston rod 110 of the double-acting pneumatic cylinder 105, which rod projects out of a cylinder housing 111 of the pneumatic cylinder 105. At the end of the cylinder housing 111 remote from the forked head 109 the cylinder housing 111 is pivotably connected with a mount 112, which in turn is screw-connected at the reference number 113 in FIG. 10 from below to the base section 88 of the coating bowl 36.

It will be evident to the expert that the flap 104 can be pivoted, by suitable pneumatic loading of the pneumatic cylinder 105, from its diverting position, which is illustrated in FIG. 5 by a solid line, over the nozzle 40 into its clearance position, which is illustrated in FIG. 5 by a dashed line, near the nozzle 40 and conversely. A proximity sensor (not shown) provided at the pneumatic cylinder 105 can in that case give information about the respective position of the flap 104.

Further details of the mixing device 12 can be inferred from, in particular, FIGS. 6 to 9. As, firstly, FIG. 6 shows best, the mixing device 12 has an individual housing 114 with a front, i.e. on the left in FIG. 6, opening on which a flange plate 115 as support for the conveying device 26, the mixing container 28 and the multi-way valve 32 is flange-mounted. The housing 114 itself is mounted by an angle bracket 116 on the vertical partition wall 91 of the coating system 10.

As FIG. 6, in particular, further shows the conveying device 26 comprises a syringe pump 117 with a syringe cylinder 118 and a syringe piston 119, which can be positioned by a stroke drive 120 with respect to the syringe cylinder 118. The stroke drive 120 comprises an electric motor 121, which is disposed in drive connection with the syringe piston 119 by way of a transmission mechanism 122 capable of converting a rotational movement into a longitudinal movement.

More precisely, the electric motor 121 is flange-mounted on a flange section 123 of the housing 114. A threaded spindle 124 of the transmission mechanism 122 is rotatably mounted between the flange section 123 of the housing 114 and the flange plate 115 by a roller bearing 125 comprising a movable bearing/fixed bearing arrangement. The electric motor 121 is in drive connection with the threaded spindle 124 by way of a belt drive 126 of the transmission mechanism 122. Seated on an externally threaded section 127 of the threaded spindle 124 is an actuating arm 128 which at an eye-like end has an internally threaded section 129 in engagement with the externally threaded section 127. The actuating arm 128 extends with appropriate guidance through a longitudinal slot 130 formed in the flange plate 115 and is secured by its end remote from the internally threaded section 129 to an end, which is lower in FIG. 6, of the syringe piston 119.

It will be evident to the expert that the threaded spindle 124 can be rotationally driven by the electric motor 121 via the drive belt 126. As a consequence of the threaded engagement between the externally threaded section 127 of the threaded spindle 124 and the internally threaded section 129 of the actuating arm 128, which is guided against twisting about the threaded spindle 124, the actuating arm 126 in FIG. 6 moves upwardly or downwardly depending on the respective direction of rotation of the electric motor 121. Consequently, the syringe piston 119, which is connected with the actuating arm 128 and preferably consists of borosilicate glass and which equally preferably is provided with a PTFE coating, is displaced in the syringe cylinder 118, which consists of glass, in order to either force liquid out of the syringe cylinder 118 or suck liquid into the syringe cylinder 118 depending on the direction of displacement. The syringe cylinder 118 can in that case have a capacity of, for example, 5 milliliters.

Apart from that, as far as the construction of the multi-way valve 32 is concerned it can be inferred particularly from FIGS. 3 and 6 to 8 that the multi-way valve 32 comprises a distributor housing 131, which is flange-mounted on the flange plate 115, with a total of nine connectors. These are, firstly, in star-like arrangement in clockwise sense in FIG. 7: (1) a connector 132 for a hose 133 to the storage container 14, (2) a connector 134 for the mixing container 28, (3) a connector 136 for a hose 137 to the storage container 24, (4) a connector 138 for a hose 139 to the storage container 22, (5) a connector 140 for a hose 141 to the storage container 20, (6) a connector 142 for a hose 143 to the storage container 18, (7) a connector 144 for an expulsion hose 145, which leads to the nozzle 40 in the coating bowl 36, of the liquid outlet 30, and (8) a connector 146 for a hose 147 to the storage container 16 as well as—upstream of the common plane of these connectors 132, 134, 136, 138, 140, 142, 144, 146 according to FIGS. 4, 6 and 8—(9) a connector 148 for the syringe cylinder 118 of the syringe pump 117. In addition, the multi-way valve 32 comprises a valve body 149, which is rotatably received in the distributor housing 131, and has a connecting channel 150 which depending on the rotational setting of the valve body 149 in the distributor housing 131 connects the connector 148 for the syringe cylinder 118 of the conveying device 26 with in each instance only one of the connectors 132, 134, 136, 138, 140, 142, 144, 146 for the storage containers 14, 16, 18, 20, 22, 24, the mixing container 28 and the liquid outlet 30.

According to FIG. 8 the syringe cylinder 118 of the syringe pump 117 is connected by way of a connector member 151 with the assistance of a seal 152 directly with the front connector 148 of the distributor housing 131, which leads to a connecting member 153 fixedly arranged in the distributor housing 131. In addition, it can be seen in FIG. 8 that the connecting channel 150 has two angle sections 154 and 155, namely an angle section 154 in the connecting member 153 secured against rotation and an angle section 155 in the substantially cylindrical valve body 149, wherein the angle sections 154 and 155 open into one another on an axis 156 of rotation of the valve body 149. Through rotation of the valve body 149 about the axis 156 of rotation the radially extending end of the angle section 155 in the valve body 149 is aligned with the respective connector 132, 134, 136, 138, 140, 142, 144, 146 so as to produce the corresponding connection and at the same time to separate the other connections in this plane. The connector 148 for the conveying device 26 by contrast always remains connected with the connecting channel 150.

As FIGS. 6 and 8 further show, the valve body 149 of the multi-way valve 32 is rotatable in the distributor housing 131 about the axis 156 of rotation by an electric motor 157 so that the respective connections can be automatically produced. The electric motor 157 is flange-mounted on the flange plate 115 at an inner side of the housing 114 and is in drive connection with the valve body 149 of the multi-way valve 32 by a drive shaft 158 via a transverse pin 159.

According to, in particular, FIG. 7 the mixing container 28, which is connected directly with the connector 134 at the highest point of the multi-way valve 32, comprises a mixing funnel 160 preferably of stainless steel. The mixing funnel 160 is closed at the top by a container lid 161 which is similarly of stainless steel and which is sealed relative to the mixing funnel 160 by an O-ring 162. In addition, the container lid 161 is further provided with a threaded bore in which a connecting bracket 163, with which a ventilation hose 164 is connected, is secured. The ventilation hose 164 communicates with the interior of the coating system 10 so that filtered air can pass into the mixing funnel 160. In order to avoid, as far as possible, adhesion of the coating materials to the inner walls of the mixing funnel 160 and to simplify and accelerate cleaning of the mixing funnel 160 internal surfaces of the mixing funnel 160 are electropolished or have an non-stick coating such as, for example, an FEP coating.

Finally, with respect to the storage containers 14, 16, 18, 20, 22, 24 it is to be additionally mentioned that these are each closed, in correspondence with FIGS. 4 and 6, by a respective lid 165 having a central opening for passage of the respective hose 133, 137, 139, 141, 143, 147. A filter 166 upstream of the multi-way valve 32 is associated with each storage container 14, 16, 18, 20, 22, 24. In the illustrated embodiment this filter 166 is disposed at the end of the respective hose 133, 137, 139, 141, 143, 147 in the corresponding storage container 14, 16, 18, 20, 22, 24. The filters 166 can be, for example, 10 μm PTFE filters, wherein the selection of the filter 166 is oriented on the one hand to the size of the particles in the respective coating material and on the other hand also to the viscosity of the coating materials as well as the desired rate of injection.

Figure 11:
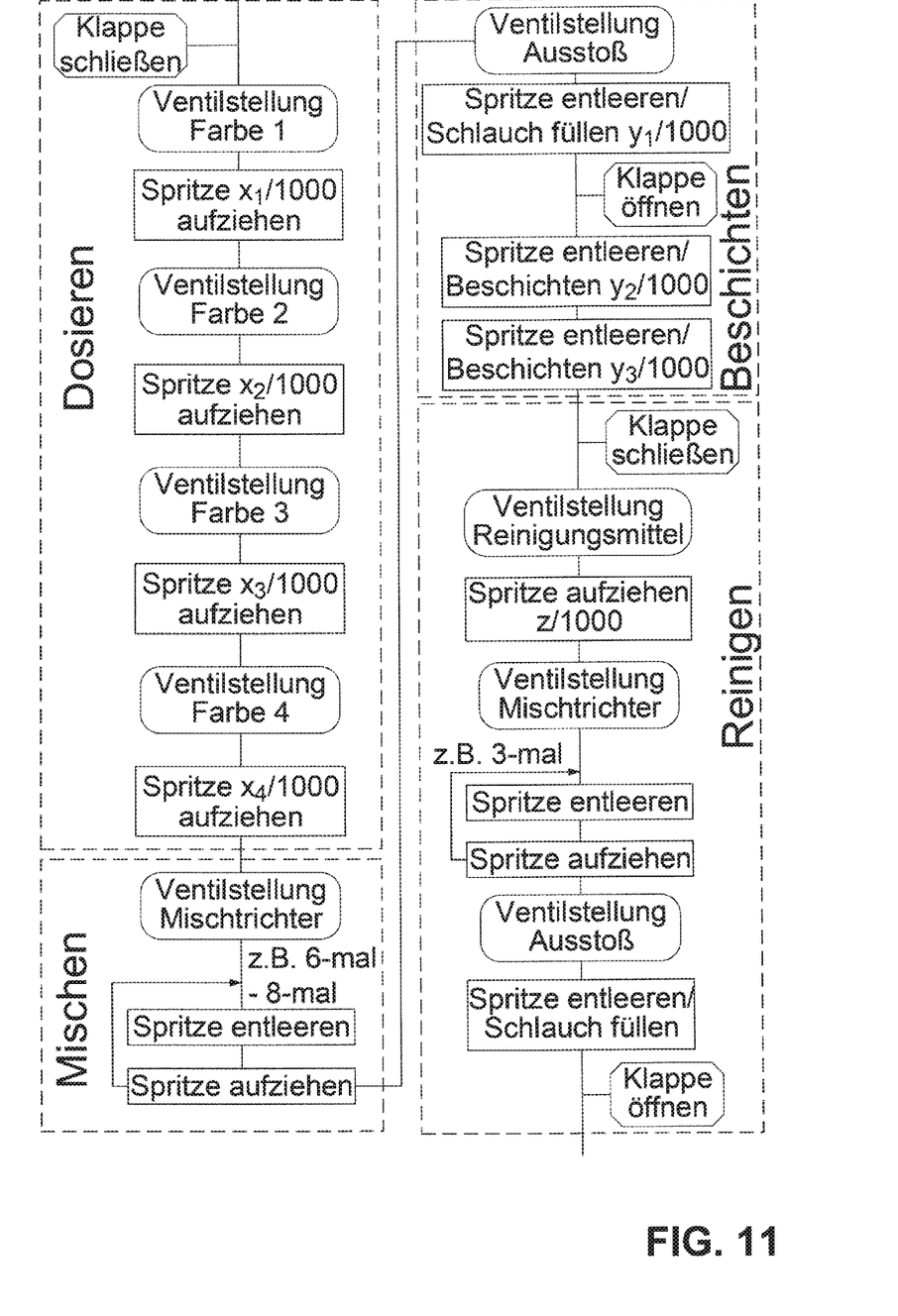
FIG. 11 shows a flow chart reproducing the individual process steps which are connected with the device according to the invention for mixing and/or metering and which are performed in succession during individual coloring of a spectacle lens in the coating system according to FIG. 1.

Finally, a possible procedure such as can be operated in the coating system 10 with the mixing device 12 in order to individually color the spectacle lens L shall be described on the basis of the flow chart according to FIG. 11. In general, a method for individual coloring of, in particular, spectacle lenses L is distinguished by the following method steps: (i) providing a spectacle lens L or a spectacle lens pair; (ii) selecting an individual color for the spectacle lens L or the spectacle lens pair from a plurality of colors, for the mixing of which a respective mixing ratio of different starting colors is known; (iii) metering the provided different starting colors in sub-quantities, which are needed for mixing the selected individual color in correspondence with the known mixing ratio, for a total quantity just sufficient for coloring the spectacle lens L or the spectacle lens pair; (iv) mixing the metered sub-quantities of starting colors in order to obtain a mixed total quantity of the selected individual color; and (v)

coating the spectacle lens or the spectacle lens pair with the mixed total quantity of the selected individual color.

In detail the above method steps can in that case elapse with particular reference to the mixing device 12 in correspondence with the flow chart of FIG. 11, which basically distinguishes four process steps, namely metering, mixing, coating and cleaning.

In the first process step (metering) the liquid starting materials (colors 1 to 4) are metered by the syringe pump 117 (syringe). For that purpose, initially the flap 104 of the diverter device 103 is closed, i.e. pivoted by the pneumatic cylinder 105 so that an unintended coating of the respective spectacle lens L is excluded (close flap).

In order to meter a total quantity of the selected individual color, the multi-way valve 32 is initially switched in such a way that the storage container 18, which is third from the left in FIGS. 2 and 3, is connected with the syringe cylinder 118 of the syringe pump 117 (valve setting 'color 1'; black in the example). The syringe piston 119 of the syringe pump 117 is then moved by the stroke drive 120 through a specific first travel in direction out of the syringe cylinder 118 so that a defined first sub-quantity of the color 1 is sucked into the syringe cylinder 118 (draw up syringe $x_1/1000$).

The multi-way valve 32 is thereafter switched into a valve setting in which the fourth storage container 20 is connected with the syringe cylinder 118 of the syringe pump 117 (valve setting 'color 2'; blue in the example), whereupon the syringe piston 119 is moved through a specific second travel further out of the syringe cylinder 118 in order to suck a defined second sub-quantity of the color 2 into the syringe cylinder 118 (draw up syringe $x_2/1000$).

Subsequently, the sub-quantities of the color 3 from the storage container 22 (valve setting 'color 3': red in the example) and the color 4 from the storage container 24 (valve setting 'color 4'; yellow in the example) are admetered in analogous manner by way of specific third and fourth further travels of the syringe piston 119 in the syringe cylinder 118 (draw up syringe $x_3/1000$ and draw up syringe $x_4/1000$). The sub-quantities $x_1/1000$ to $x_4/1000$ in that case result from the known mixing ratio for the selected individual colors.

In the second process step (mixing), the colors 1 to 4 sucked into the syringe cylinder 118 in correspondence with the selected individual colors are mixed together. For that purpose the multi-way valve 32 is switched into a valve setting in which the syringe cylinder 118 of the syringe pump 117 is connected with the mixing container 28 having the mixing funnel 160 (valve setting 'mixing funnel'). The syringe piston 119 is now displaced by the stroke drive 120 into the syringe cylinder 118 of the syringe pump 117 so that the colors 1 to 4 previously sucked into the syringe cylinder 118 are expelled by way of the multi-way valve 32 into the mixing container 28 (empty syringe).

The mixed color is subsequently sucked again in known manner into the syringe cylinder 118 (draw up syringe). When passing the mixing funnel 160 the color is in that case subjected to turbulence for enhanced intimate mixing. In order to achieve particularly good intimate mixing, this process is repeated, for example, six to eight times (empty syringe and draw up syringe in alternation).

For coating of the spectacle lens L in the third process step (coating) the multi-way valve 32 is switched into a valve setting in which the syringe cylinder 118 is connected with the liquid outlet 30 (valve setting 'expulsion'). As already described above, the nozzle 40, which is arranged in the coating chamber 38, of the liquid outlet 30 is connected with the multi-way valve 32 by way of an expulsion hose 145.

Before the spectacle lens L rotatably held in the coating chamber 38 at the substrate holder 34 can be coated the liquid outlet 30, which is filled with solvent from a storage process and which includes the nozzle 40 and the expulsion hose 145, has to be filled with the mixed individual color. For that purpose the syringe piston 119 is displaced by the stroke drive 120 through a corresponding travel in the syringe cylinder 118 of the syringe pump 117 (empty syringe/fill hose $y_1/1000$). In that case, liquid issuing at the nozzle 40 of the liquid outlet 30 cannot reach the spectacle lens L since the spectacle lens L is screened by the flap 104 of the diverting device 103.

The flap 104 of the diverting device 103 is then pivoted by the pneumatic cylinder 105 into the clearance position (open flap). Subsequently thereto the coating, which is known per se, of the spectacle lens L takes place, wherein the syringe piston 119 is displaced by the stroke drive 120 through a specific further travel in the syringe cylinder 118 of the syringe pump 117. In that case the syringe piston 119 displaces the quantity, which is needed for coating spectacle lens L, of mixed individual color so that this is expelled in the direction of the rotating spectacle lens L by way of the nozzle 40 (empty syringe/coat $y_2/1000$). Since in this embodiment two spectacle lenses L are to be coated, this process is repeated again for the second spectacle lens L (empty syringe/coat $y_3/1000$).

In the concluding—with respect to the mixing device 12—process step (cleaning), initially the flap 104 of the diverter device 103 is closed in known manner (close flap), whereupon the multi-way valve 32 is switched into a valve setting in which the storage container 14, which is first from the left in FIGS. 2 and 3, for solvent is connected with the syringe cylinder 118 (valve setting cleaning agent). The solvent is sucked in known manner in an amount, which is needed for the cleaning, by way of the syringe piston 119 into the syringe cylinder 118 of the syringe pump 117 (draw up syringe $z/1000$).

The multi-way valve 32 is then switched into a valve setting in which the syringe cylinder 118 is connected with the mixing container 28 (valve setting 'mixing funnel'). The solvent for cleaning the mixing container 28 and the syringe pump 117 is thereupon expelled, for example three times, from the syringe cylinder 118 into the mixing container 28 (empty syringe) and sucked from the mixing container 28 into the syringe cylinder 118 (draw up syringe).

Subsequently, the multi-way valve 32 is switched into a valve setting in which the syringe cylinder 118 is connected with the liquid outlet 30 (valve setting 'expulsion'). The residual color remaining in the expulsion hose 145 and the nozzle 40 from the coating process is displaced by the solvent expelled from the syringe cylinder 118. In addition, the expulsion hose 145 and the nozzle 40 are rinsed by the solvent and subsequently filled again with solvent (empty syringe/fill hose). The displaced residual color and excess solvent in that case pass via the drain 93 of the coating lock 36, the connecting bracket 94 and the drain hose 95 into the waste container 96. Finally, the flap 104 of the diverter device 103 in the coating chamber 38 is pivoted back into the clearance position by the pneumatic cylinder 105 (open flap).

A device for mixing/metering liquid coating materials, particularly for use in a coating system for spectacle lenses, comprises at least one first storage container and second storage container for liquid starting materials, a conveying device for sucking up and expelling liquids, a mixing container and a liquid outlet for mixed/metered liquid coating materials. Arranged therebetween is a multi-way valve which is switchable into different valve settings and adapted to produce one of the following connections and in that case separate the respective other connections: (a) connection between the first storage container and the conveying device, (b) connection between the second storage container and the conveying device, (c) connection between the conveying device and the mixing container and (d) connection between the conveying device and the liquid outlet. A method for individual coloring of spectacle lenses can thus be performed in which the individual color is reproducible, in accordance with a known mixing ratio, for only one spectacle lens or for a spectacle lens pair.

Other variations and modifications are possible without departing from the scope and spirit of the present invention as defined by the appended claims.

We claim:

1. A device (12) for mixing and/or metering liquid coating materials, which is constructed to be integrated in a coating system (10) for spectacle lenses (L), and to mix and meter the liquid coating materials for individual coating of individual spectacle lenses, comprising at least one first and at least one second storage container (14-24) for liquid starting materials, a single conveying device (26) for sucking up and expelling liquids, a mixing container (28) with a single port connector for the intake and discharging of the liquid coating materials, a liquid outlet (30) for mixed and/or metered liquid coating materials, a single multi-way valve (32) capable of rotating, and a connecting member (153) having an angled channel for placing said conveying device in fluid communication with said single multi-way valve and said connecting member is rotatably fixed relative to said single multi-way valve, wherein said single multi-way valve is arranged between said first and second storage containers (14-24), said conveying device (26), said connecting member (153), said port connector of said mixing container (28) and said liquid outlet (30), and wherein the single multi-way valve is switchable into different valve settings and constructed to produce one of the following connections (a, b, c, d) and in that case to separate the respective other connections:
   (a) connection between said first storage container and said conveying device (26),
   (b) connection between said second storage container and said conveying device (26),
   (c) connection between said conveying device (26) and said port connector of said mixing container (28), said port connector having a conduit such that liquid coating materials can reversibly enter and exit said mixing container (28) through said same port connector conduit of said mixing container (28), and
   (d) connection between said conveying device (26) and said liquid outlet (30).

2. A device (12) for mixing and/or metering liquid coating materials according to claim 1, wherein the conveying device (26) comprises a syringe pump (117) with a syringe cylinder (118) and a syringe piston (119), which is positionable with respect to the syringe cylinder (118) by a stroke drive (120).

3. A device (12) for mixing and/or metering liquid coating materials according to claim 2, wherein the stroke drive (120) comprises an electric motor (121) disposed in drive connection with the syringe piston (119) by way of a transmission mechanism (122) capable of converting a rotational movement into a longitudinal movement.

4. A device (12) for mixing and/or metering liquid coating materials according to claim 3, wherein the mixing container (28) comprises a mixing funnel (160).

5. A device (12) for mixing and/or metering liquid coating materials according to claim 4, wherein internal surfaces of the mixing funnel (160) are electropolished or have an anti-adhesion coating.

6. A device (12) for mixing and/or metering liquid coating materials according to claim 5, wherein the multi-way valve (32) comprises a distributor housing (131) with connectors (132, 134, 136, 138, 140, 142, 144, 146, 148) for the storage containers (14, 16, 18, 20, 22, 24), said port connector of said mixing container (28), the liquid outlet (30) and the conveying device (26) as well as a valve body (149), which is rotatably mounted in the distributor housing (131) and has a connecting channel (150) which as a function of the rotational setting of the valve body (149) in the distributor housing (131) is capable of connecting the connector (148) for the conveying device (26) with one of the connectors (132, 134, 136, 138, 140, 142, 144, 146) for the storage containers (14, 16, 18, 20, 22, 24), said port connector of said mixing container (28) and the liquid outlet (30).

7. A device (12) for mixing and/or metering liquid coating materials according to claim 6, wherein the valve body (149) of the multi-way valve (32) is rotatable by an electric motor (157) in the distributor housing (131).

8. A device (12) for mixing and/or metering liquid coating materials according to claim 7, wherein a filter (166) disposed upstream of the multi-way valve (32) is associated with each storage container (14, 16, 18, 20, 22, 24).

9. A device (12) for mixing and/or metering liquid coating materials according to claim 2, wherein the mixing container (28) comprises a mixing funnel (160).

10. A device (12) for mixing and/or metering liquid coating materials according to claim 9, wherein internal surfaces of the mixing funnel (160) are electropolished or have an anti-adhesion coating.

11. A device (12) for mixing and/or metering liquid coating materials according to claim 10, wherein the multi-way valve (32) comprises a distributor housing (131) with connectors (132, 134, 136, 138, 140, 142, 144, 146, 148) for the storage containers (14, 16, 18, 20, 22, 24), said port connector of said mixing container (28), the liquid outlet (30) and the conveying device (26) as well as a valve body (149), which is rotatably mounted in the distributor housing (131) and has a connecting channel (150) which as a function of the rotational setting of the valve body (149) in the distributor housing (131) is capable of connecting the connector (148) for the conveying device (26) with one of the connectors (132, 134, 136, 138, 140, 142, 144, 146) for the storage containers (14, 16, 18, 20, 22, 24), said port connector of said mixing container (28) and the liquid outlet (30).

12. A device (12) for mixing and/or metering liquid coating materials according to claim 11, wherein a filter (166) disposed upstream of the multi-way valve (32) is associated with each storage container (14, 16, 18, 20, 22, 24).

13. A device (12) for mixing and/or metering liquid coating materials according to claim 1, wherein the mixing container (28) comprises a mixing funnel (160).

14. A device (12) for mixing and/or metering liquid coating materials according to claim 1, wherein the multi-way valve (32) comprises a distributor housing (131) with connectors (132, 134, 136, 138, 140, 142, 144, 146, 148) for the storage containers (14, 16, 18, 20, 22, 24), said port connector of said mixing container (28), the liquid outlet (30) and the conveying device (26) as well as a valve body (149), which is rotatably mounted in the distributor housing (131) and has a connecting channel (150) which as a function of the rotational setting of the valve body (149) in the distributor housing (131) is capable of connecting the connector (148) for the conveying device (26) with one of the connectors (132, 134, 136, 138, 140, 142, 144, 146) for the storage containers (14, 16, 18, 20, 22, 24), said port connector of said mixing container (28) and the liquid outlet (30).

15. A device (12) for mixing and/or metering liquid coating materials according to claim 14, wherein the valve body (149) of the multi-way valve (32) is rotatable by an electric motor (157) in the distributor housing (131).

16. A device (12) for mixing and/or metering liquid coating materials according to claim 15, wherein a filter (166) disposed upstream of the multi-way valve (32) is associated with each storage container (14, 16, 18, 20, 22, 24).

17. A device (12) for mixing and/or metering liquid coating materials according to claim 1, wherein a filter (166) disposed upstream of the multi-way valve (32) is associated with each storage container (14, 16, 18, 20, 22, 24).

18. A device (12) for mixing and/or metering liquid coating materials, which is constructed to be integrated in a coating system (10) for spectacle lenses (L), and to mix and meter the liquid coating materials for individual coating of individual spectacle lenses, comprising at least one first and at least one second storage container (14-24) for liquid starting materials, a single conveying device (26) for sucking up and expelling liquids, a mixing container (28) with a single port connector for the intake and discharging of the liquid coating materials, a liquid outlet (30) for mixed and/or metered liquid coating materials, and a single multi-way valve (32), which is arranged between said first and second storage containers (14-24), said conveying device (26), said port connector of said mixing container (28) and said liquid outlet (30), and which is switchable into different valve settings and constructed to produce one of the following connections (a, b, c, d) and in that case to separate the respective other connections:
  (a) connection between said first storage container and said conveying device (26),
  (b) connection between said second storage container and said conveying device (26),
  (c) connection between said conveying device (26) and said port connector of said mixing container (28), and
  (d) connection between said conveying device (26) and said liquid outlet (30),
    wherein the multi-way valve (32) comprises a distributor housing (131) with connectors (132, 134, 136, 138, 140, 142, 144, 146) for the storage containers (14, 16, 18, 20, 22, 24), said port connector of said mixing container (28) and the liquid outlet (30),
    said connectors (132, 134, 136, 138, 140, 142, 144, 146) being coplanar with each other,
    said distributor housing (131) further having a connector (148) for said conveying device (26) which is positioned on a different plane and in front of the coplanar connectors (132, 134, 136, 138, 140, 142, 144, 146) of said distributor housing (131),
    wherein a valve body (149) is rotatably mounted in the distributor housing (131) about an axis of rotation (156) and has a connecting channel (150) which as a function of the rotational setting of the valve body (149) in the distributor housing (131) is capable of connecting the connector (148) for the conveying device (26) with one of the connectors (132, 134, 136, 138, 140, 142, 144, 146) for the storage containers (14, 16, 18, 20, 22, 24), said port connector of said mixing container (28) and the liquid outlet (30).

19. A device (12) for mixing and/or metering liquid coating materials according to claim 18, wherein said valve body (149) is rotatable about said axis of rotation (156) by an electric motor (157) that is mounted on the opposite side of said connector (148) for said conveying device (26) with respect to said coplanar connectors (132, 134, 136, 140, 142 144, 146) of said distributor housing (131).

20. A device (12) for mixing and/or metering liquid coating materials, which is constructed to be integrated in a coating system (10) for spectacle lenses (L), and to mix and meter the liquid coating materials for individual coating of individual spectacle lenses, comprising at least one first and at least one second storage container (14-24) for liquid starting materials, a single conveying device (26) for sucking up and expelling liquids, a mixing container (28) with a single port connector for the intake and discharging of the liquid coating materials, a liquid outlet (30) for mixed and/or metered liquid coating materials, a single multi-way valve (32) capable of rotating, and a connecting member (153) having an angled channel for placing said conveying device in fluid communication with said single multi-way valve and said connecting member is placed outside a plane of rotation of said single multi-way valve, wherein said single multi-way valve is arranged between said first and second storage containers (14-24), said conveying device (26), said connecting member (153), said port connector of said mixing container (28) and said liquid outlet (30), and wherein the single multi-way valve is switchable into different valve settings and constructed to produce one of the following connections (a, b, c, d) and in that case to separate the respective other connections:
  (a) connection between said first storage container and said conveying device (26),
  (b) connection between said second storage container and said conveying device (26),
  (c) connection between said conveying device (26) and said port connector of said mixing container (28), said port connector having a conduit such that liquid coating materials can reversibly enter and exit said mixing container (28) through said same port connector conduit of said mixing container (28), and
  (d) connection between said conveying device (26) and said liquid outlet (30).

* * * * *